(12) United States Patent
Kulangara et al.

(10) Patent No.: US 7,034,372 B1
(45) Date of Patent: Apr. 25, 2006

(54) HGA DYNAMICS TESTING WITH SHEAR MODE PIEZO TRANSDUCERS

(75) Inventors: Sivadasan Kulangara, Temecula, CA (US); Amanullah Khan, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 23 days.

(21) Appl. No.: 10/930,918

(22) Filed: Aug. 31, 2004

Related U.S. Application Data

(60) Provisional application No. 60/554,017, filed on Mar. 16, 2004.

(51) Int. Cl.
*H01L 29/84* (2006.01)

(52) U.S. Cl. ............... 257/415; 257/E27.006
(58) Field of Classification Search ............ None
See application file for complete search history.

(56) References Cited

U.S. PATENT DOCUMENTS

| | | | |
|---|---|---|---|
| 6,175,182 B1 * | 1/2001 | Cross et al. | 310/328 |
| 6,363,777 B1 * | 4/2002 | Tsay et al. | 73/105 |

OTHER PUBLICATIONS

Sivadasan Kulangara, "Shear-Mode Piezo Transducers for HGA Dynamics Testing," IEE Transactions On Magnetics, Sep. 2003, pp. 2246-2248, vol. 39, No. 5.

* cited by examiner

*Primary Examiner*—Tu-Tu Ho
(74) *Attorney, Agent, or Firm*—Louis J. Bachand

(57) ABSTRACT

An HGA dynamics tester and method are provided in which a shear mode piezo actuator having a dimensional change responsive to an input voltage while supported on a mass is coupled through an HGA support to impart movement to the HGA responsive to the actuator dimensional change.

7 Claims, 2 Drawing Sheets

HGA DYNAMICS TESTING WITH SHEAR MODE PIEZO TRANSDUCERS

RELATED APPLICATION

This application claims the benefit of U.S. Provisional application Ser. No. 60/554,017, filed Mar. 16, 2004.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to resonance testing of head gimbal assemblies (HGAs) to be used in disk drive suspensions, and, more particularly, to apparatus and method that use piezo actuators in shear mode ($d_{15}$) rather than the conventional electromagnetic/electrodynamic shakers, or non-shear mode ($d_{33}$) piezo stacks to provide a movement impetus to the HGA that is useful in resonance testing and in other dynamics sensing. Shear-mode piezo actuators are compact and provide linear, repeatable movements at frequencies up to several tens of kilohertz, importantly with minimal out-of-plane movement. As a further advantage the present testing devices can be used for such separate functions as windage testing, FRF testing, and micro-actuator stroke testing.

2. Description of the Related Art

As recording track densities increase and servo bandwidths also increase, there is an urgent need to test HGA resonance at high frequencies. In the prior art, mostly electromagnetic/electrodynamic shakers have been used in resonance testers. But testers using electromagnetic/electrodynamic shakers have been found to interfere with the obtaining of accurate results by interacting with HGA vibration modes. An electromagnetic/electrodynamic shaker, for example, with large off-axis motion produces in the HGA unwanted out-of-plane modes that cross couple with the in-plane HGA modes.

Most HGA resonance testers, then, suffer from unpredictable dynamics as a result of off-axis compliance problems; these problems are exacerbated at higher frequencies. Attempts at mechanically minimizing the off-axis movements with bearings and guide structures have helped, but mechanical expedients introduce further problems, such as friction and the need for continual lubrication, that affect repeatability over time.

The use of $d_{33}$ mode piezo stack transducers in place of the electromagnetic/electrodynamic shakers has been suggested. Although these piezo transducers exhibit relatively repeatable performance, their out-of-plane movements are huge when mounted in the suggested cantilevered arrangement. At some frequencies, the out-of-plane movement (displacement) of these $d_{33}$ piezo stacks even exceed the desired in-plane movements

BRIEF SUMMARY OF THE INVENTION

It has now been discovered that effective and inexpensive HGA testing is realized when piezo transducers in a tester are energized in the shear ($d_{15}$) mode. These piezo transducers produce a force couple that is proportional to the voltage applied, a property that is used in the invention to create in-plane forces for HGA testing.

These shear-mode piezo transducers are further useful to sense the forces acting on HGAs mounted on them. When subjected to a force field (such as windage or micro-actuator reaction forces), a part of the force field is transmitted to the piezo shear sensor via the HGA mount. The shear-sensor in turn generates a charge proportional to these forces, which can be measured and calibrated against those forces.

Accordingly, the invention provides an HGA dynamics tester comprising a shear mode piezo actuator having a dimensional change responsive to an input voltage, a mass supporting the actuator while allowing the dimensional change, and an HGA support coupled to the actuator and having movement responsive to the actuator dimensional change, the HGA support being arranged to impart its movement to an HGA mounted thereon.

In this and like embodiments, typically, the HGA support comprises a load plate, and the HGA comprises a load beam having a mount plate at its proximate end, the load plate being fixed to the mount plate for imparting load plate movement to the load beam via the mount plate, and/or the load beam is cantilevered from the load plate.

In a further embodiment, an HGA dynamics tester is provided comprising a shear mode $d_{15}$ piezo actuator having a dimensional change responsive to an input voltage, a voltage supply, a mass supporting the actuator while allowing the dimensional change, and an HGA support coupled to the actuator and having movement responsive to the actuator dimensional change, the HGA support being arranged to impart its movement to an HGA mounted thereon.

In this and like embodiments, typically, the HGA support comprises a load plate, and the HGA comprises a load beam having a distal end, a proximate end, and a mount plate fixed to the proximate end, the load plate being fixed to the mount plate for imparting load plate movement to the load beam via the mount plate, and the load beam is cantilevered from the load plate.

In its method aspects, the invention provides a method of dynamics testing an HGA, including fixing the HGA by its proximate end to a shear mode piezo actuator, and imparting movement to the HGA by applying a voltage to the actuator.

BRIEF DESCRIPTION OF THE SEVERAL VIEWS OF THE DRAWINGS

The invention will be further described in conjunction with the attached drawings in which.

DESCRIPTION OF THE PREFERRED EMBODIMENTS

Figure 1:
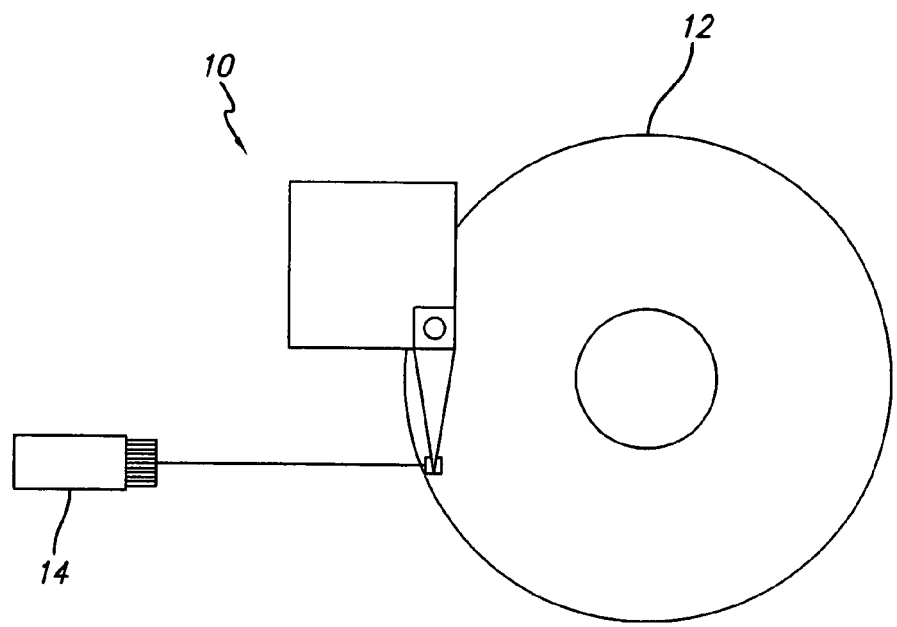
FIG. 1 is a schematic view of the dynamics tester set up according to the invention.

Separate HGA dynamics testers with separate functionalities, such as a Windage tester, an FRF tester, and a stroke tester (for testing micro-actuator stroke) are known. Multiple functionalities in a single tester have proved difficult to achieve, for example, because the necessary miniaturization of a tester for Windage measurement has prevented known dynamics testers from having a Windage functionality. Modular systems have been attempted that require swapping a reconfiguration of the tester to perform different tests. HGA level Windage testers have tended to evolve from custom drive level requirements such as the need to correlate the Windage spectrum of an HGA with that of an HSA (Head Stack Assembly) within a particular disk drive. Hence, these testers typically had arm mounts that mimic a traditional E-block. Most of the testers made used LDVs to measure displacement/velocity by non-contact means. Viable means to measure the force exerted by the HGA mount plate on the mount surface were not known.

The invention relates generally to an all-in-one tester to test dynamics at the HGA level, rather than switch between testers or tester modules with coincident cycles of equipment alignment and calibration. Because of the highly sensitive nature of the measurements performed even minor changes in the test set-up was bound to cause non-repeatable errors in the measurement results.

For example, parameters such as Windage and FRF are inter-linked and highly dependent on the test conditions such as mounting conditions of the HGA, including the method of HGA attachment to the arm, contact area, retention forces/torques prevalent on the mount plate, Z-height of the HGA from the disk surface, and relative pitch and roll angles between the mount plate and the disk surface to mention just some of the factors involved. To ensure the repeatability of the test conditions, it is desirable to run an FRF test and a Windage test in a single set-up. Previously known technology, however, runs FRF tests only on top of a disk, while Windage tests must be performed between two spinning disks, so there has always been a need for a configuration change between FRF and Windage tests.

The displacement/velocity sensor (usually an LDV) has not been located near to its target as the shakers need to work on one side of the disk pack because of their shape and size while the LDV is compromised and senses the target from across the disk pack. This spaced configuration of LDV and shakers causes the LDV to pick up noises from the disk pack. A part of the laser beam, which is conical and has its base at its source, although targeted at the slider, can hit the disk surface and bounce back to the source, giving rise to clutter and spurious readings on the LDV. The prior art set-up can also fail to emulate the correct skew angle of the HGA at the chosen flying location of the slide because of restrictions imposed by the geometry of the sensor alignment. Further, using the shakers in a cantilevered mode as done in the past affects the dynamic balance of the moving parts and reduces the operational bandwidth of the shaker. As noted above, previous Windage shakers had HGA's mounted to arms shaped like conventional E-blocks which were cantilevered at their pivot points. The arms with mass-saving features and large structural compliances exaggerated the windage-induced displacements and introduced arm-modes, making it difficult to evaluate pure HGA level Windage spectra. Unduly expensive LDVs have been used heretofore to compensate for a lack of facility to sense mount plate forces and correlate them with HGA dynamics.

The present invention enables an all-in-one tester that requires no configurational/set-up changes whether FRF, Windage or Micro actuator stroke tests are to be conducted.

Figure 2A:
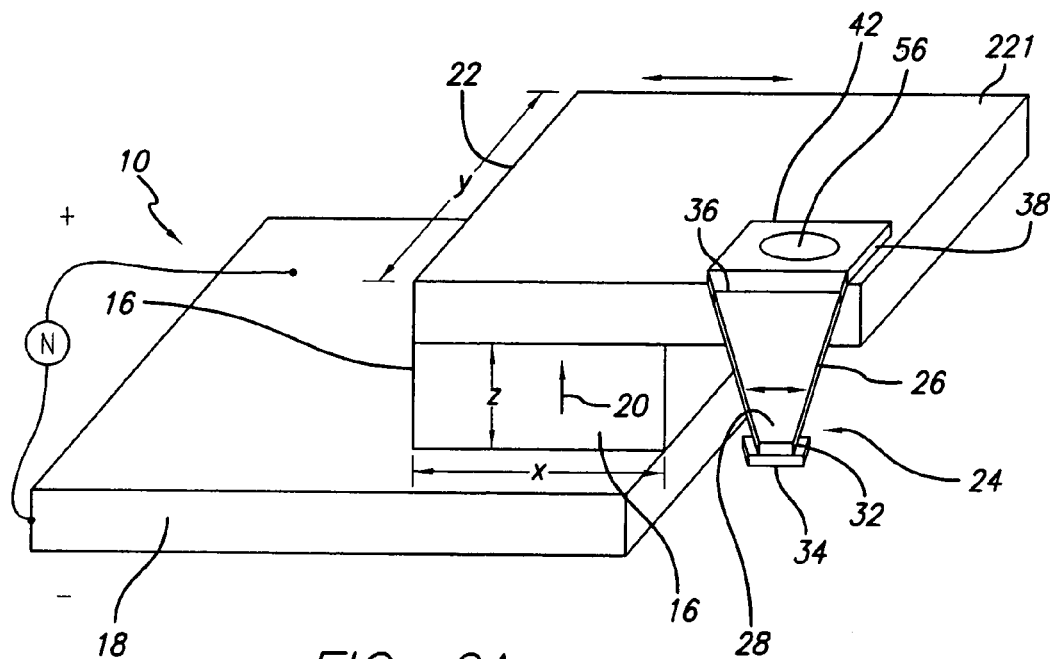
FIG. 2A. is a generally n isometric view, partly schematic, of a shear-mode piezo-based HGA shaker according to the invention, showing in-plane direction parallel to the HGA mount plate and out-of-plane direction as orthogonal to the in-plane direction, the transducer having x, y and z axis dimensions.

With reference initially to FIGS. 1 and 2A, an HGA shaker according to the invention is shown at 10 arranged adjacent a disk pack 12, where its small size enables testing between disks in a pack, and a LDV (Laser Doppler Vibrometer) 14 on the same side of the disk pack as the shaker.

HGA shaker 10 includes a shear-mode piezo actuator 16 supported on a mass 18, and surmounted by a load plate 22. The piezo crystal actuator 16 poling direction is vertical as indicated by arrow 20. The piezo crystal is adhesively and electrically attached to metal plates namely the mass 18 and load plate 22. The HGA is shown at 24 and comprises a beam portion 26, a distal end 28 typically and as shown supporting a flexure 32 and a slider 34 thereon, a spring portion 36, a proximate portion 38, generally rectangular, and a rectangular mount plate 42 fixed to the proximate portion. The HGA 24 mount plate 42 is fixed to the load plate 22 with the HGA is cantilevered from the load plate, as detailed below.

Shaker 10 in use as an HGA resonance/FRF tester has a voltage applied between the top and bottom plates mass 18 and load plate 22. This causes the piezo crystal 16 to shear in such a way that the top plate 22 moves horizontally and relative to the bottom plate, mass 18. In use as a Windage or Stroke tester, the transducing properties of the piezo crystal 16 work as a force sensor by converting the shear-mode forces acting on the plate 22 into proportional charges that can be amplified into measurable voltages.

A notable advantage of a shear mode piezo device is that it can be very thin and yet also powerful because the governing electric equations are independent of the device thickness. In practice, the piezo actuator/sensor comprising the piezo crystal, the metal plates, high voltage insulation and electrical connections are built into a very thin form factor, so thin that it can be slid between adjacent disks in a disk pack.

The arrangement illustrated in FIGS. 1 and 2a provides in-plane direction movement of the HGA distal end 28 (horizontal double-headed arrow 21) parallel to the plane of the load plate 22, and any out-of-plane direction movement normal or orthogonal to the in-plane direction movement (shown as a vertical double-headed arrow). Piezo actuator 16 has x, y, and z (length, width and height) dimensions as indicated. The simplicity of the invention HGA shaker is readily apparent.

Shear-mode piezo shakers have the advantage of being available in a flat and thin configuration so that the whole shaker 10 or a cantilevered edge 221 of the load plate 22 can be thrust into an inter-disk axial spacing (typically 65–100 mils) between the co-rotating disks in a multiple disk pack, not shown This inter-disk placement enables both resonance and windage testing of an HGA 24 mounted on the load-plate 22 and flying between opposing disks in a single setting of the tester shaker 10. Windage testing of an HGA is preferably done in-between disks in a multi-disk pack, for accuracy. This capability enhances the throughput of the tester shaker 10.

Figure 2B:
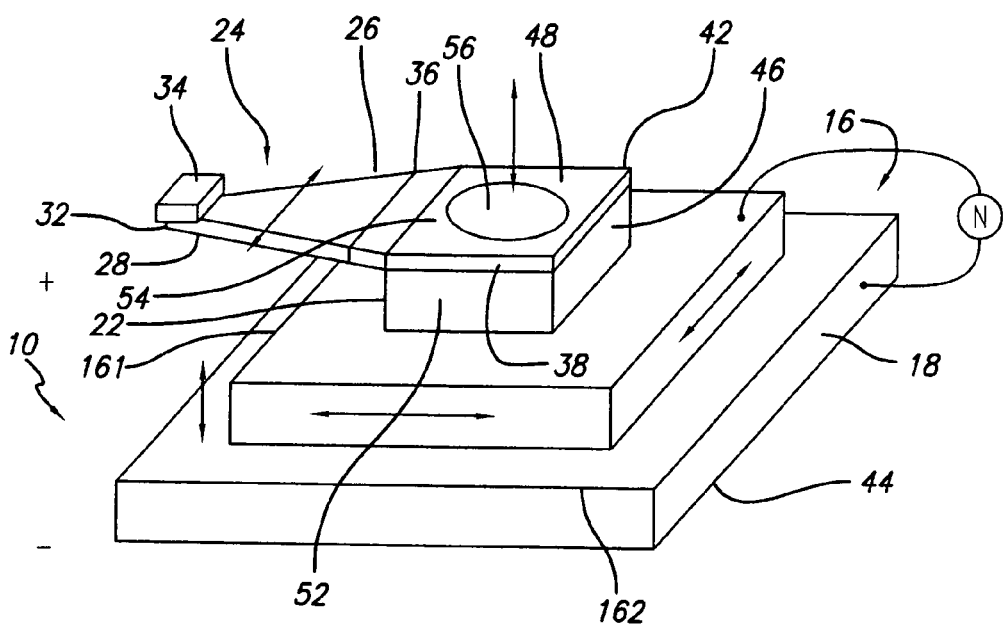
FIG. 2B is a view like FIG. 2A with a different configuration, having the HGA under test mounted centrally of the shaker; and, FIG. 3 is a graphical depiction of microactuator stroke measurement with a shear-mode piezo device according to the invention.

In FIG. 2B, wherein like parts have like numerals plus 100, a generally symmetrical mounting arrangement is shown. Piezo actuator 116 has upper and lower electrodes 161, 162, respectively, arranged parallel to the actuator direction of polarization. Actuator 16 is fixed at its lower surface 44 to the mass 18 which then acts as a rigid base for the HGA shaker 10. Actuator 16 upper surface 46 supports the centrally disposed load plate 22. Load plate 22 has a threaded counter-sunk hole 48 that opposes a like hole 52 in mount plate 42 and HGA boss 54 and through which a fastening screw 56 is inserted to fasten the HGA 24 to the load plate.

Reference axes in piezo transducers are termed 1, 2 and 3, analogously to x, y and z axes of objects, while axes 4, 5 and 6 identify rotations. Piezo transducer directions of polarization (3) are established during manufacture. Modes $d_{33}$ and $d_{31}$ are referred to as breathing modes and $d_{15}$ is the shearing mode. In this nomenclature, $d_{31}$ would have voltage applied in the "3": direction and resultant length changes would be measured in the "1" direction. In a $d_{33}$ actuator, voltage is again applied in the "3" direction, but the length change is measured in the "3" direction.

Experiments with the actuator configuration, varying the transducer's geometry ('x', 'y' and 'z') lead to the following conclusions: The in-plane and off-plane gain-peaks appear at lower frequencies as the device thickness increases; A larger device area (product of 'x' and 'y') results in lower out-of-plane movements; For 'thin' piezo devices, adhesive attachment of the load plate smoothes (reduces the magnitude of gain-peaks in the profile of) in-plane FRF; and, Flying of the HGAs (attached to the actuator) did not make significant impacts on the shaker's in-plane and out-of-plane gains.

Further a slight roll motion of the top surface (about X-axis) was observed on some devices for certain combinations of device thicknesses, voltages and load plate boundary conditions.

More details can be found in *Shear-Mode Piezo Transducers for HGA Dynamics Testing*, IEEE Transactions On Magnetics, Vol. 39, No. 2, September 2003, the contents of which is incorporated herein by this reference.

Shear-Mode Piezo Devices as Sensors

Shear-mode piezo transducers can be used to sense the forces acting on HGAs mounted on them. When subjected to a force field (such as Windage or Micro-actuator reaction forces), a part of the force is transmitted to the piezo shear sensor via the HGA mount. The shear-sensor in turn generates a charge proportional to these forces, which can be measured and calibrated against those forces.

Figure 3:
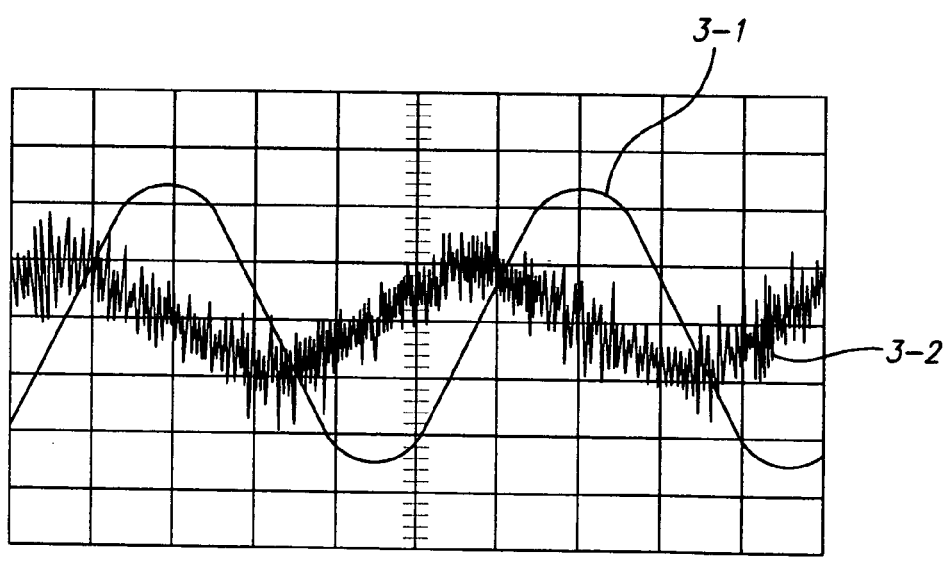

In FIG. 3, the pure sinusoid trace 3-1 depicts the stroke registered on a shear-mode piezo sensor by a micro-actuated HGA mounted on it. The sinusoid 3-2 with high-frequency spectra depicts the velocity of the HGA tip simultaneously measured using an LDV. The piezo sensor accordingly is capable of producing robust and less noisy outputs than LDVs. His is true even at frequencies as high as 80 kHz.

It may be noted that using this method, the stroke of load-beam-based piezo secondary actuators can be measured even at HGA strip level, because there is no need to attach sliders or fly the HGAs to run the test.

Having thus described the invention, it is apparent that the use of shear-mode piezo transducers enables the building of compact, high performance, and high bandwidth shakers and/or sensors for HGA testing useful commercially as all-in-one HGA dynamic testers.

We claim:

1. An HGA dynamics tester comprising a shear mode piezo actuator having a dimensional change responsive to an input voltage, a mass supporting said actuator while allowing said dimensional change, and an HGA support coupled to said actuator and having movement responsive to said actuator dimensional change, said HGA support being arranged to impart its said movement to an HGA mounted thereon.

2. The HGA dynamics tester according to claim 1, in which said HGA support comprises a load plate, and said HGA comprises a load beam having a mount plate at its proximate end, said load plate being fixed to said mount plate for imparting load plate movement to said load beam via said mount plate.

3. The HGA dynamics tester according to claim 2, in which said load beam is cantilevered from said load plate.

4. An HGA dynamics tester comprising a shear mode $d_{15}$ piezo actuator having a dimensional change responsive to an input voltage, a voltage supply, a mass supporting said actuator while allowing said dimensional change, and an HGA support coupled to said actuator and having movement responsive to said actuator dimensional change, said HGA support being arranged to impart its said movement to an HGA mounted thereon.

5. The HGA dynamics tester according to claim 4, in which said HGA support comprises a load plate, and said HGA comprises a load beam having a distal end, a proximate end, and a mount plate fixed to said proximate end, said load plate being fixed to said mount plate for imparting load plate movement to said load beam via said mount plate.

6. The HGA dynamics tester according to claim 5, in which said load beam is cantilevered from said load plate.

7. A method of dynamics testing an HGA, including fixing said HGA by its proximate end to a shear mode piezo actuator, and imparting movement to said HGA by applying a voltage to said actuator.

\* \* \* \* \*